(12) United States Patent
Sodagar et al.

(10) Patent No.: US 12,007,605 B2
(45) Date of Patent: Jun. 11, 2024

(54) MONOLITHICALLY-INTEGRATED, POLARIZATION-INDEPENDENT CIRCULATOR

(71) Applicant: Skorpios Technologies, Inc., Albuquerque, NM (US)

(72) Inventors: Majid Sodagar, Albuquerque, NM (US); Wenyi Wang, Albuquerque, NM (US); Changyi Li, Albuquerque, NM (US); Guoliang Li, Albuquerque, NM (US); Murtaza Askari, Albuquerque, NM (US); Yi Wang, Albuquerque, NM (US); John Dallesasse, Geneva, IL (US); Stephen B. Krasulick, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 343 days.

(21) Appl. No.: 17/314,991

(22) Filed: May 7, 2021

(65) Prior Publication Data
US 2021/0405294 A1     Dec. 30, 2021

Related U.S. Application Data

(60) Continuation of application No. 15/656,331, filed on Jul. 21, 2017, now Pat. No. 11,002,911, and a
(Continued)

(51) Int. Cl.
*G02B 6/27* (2006.01)
*G02B 6/122* (2006.01)
(Continued)

(52) U.S. Cl.
CPC ......... *G02B 6/2746* (2013.01); *G02B 6/1228* (2013.01); *G02F 1/093* (2013.01); *G02B 2006/1215* (2013.01); *G02B 6/126* (2013.01)

(58) Field of Classification Search
CPC .. G02B 6/12002; G02B 6/1228; G02B 6/105; G02B 6/126; G02B 6/26; G02B 6/27;
(Continued)

(56) References Cited

U.S. PATENT DOCUMENTS

| 3,990,776 A | 11/1976 | Tseng et al. |
| 4,978,189 A | 12/1990 | Blonder et al. |

(Continued)

FOREIGN PATENT DOCUMENTS

| WO | 2003034109 A2 | 4/2003 |
| WO | 2010137752 A2 | 12/2010 |

OTHER PUBLICATIONS

Liang, et al., Integrated Polarization Beam Splitter in High Index Contrast Silicon-on-Insulator Waveguides, IEEE Photonics Technology Letters, vol. 17, No. 2, pp. 393-395, Feb. 2005.
(Continued)

*Primary Examiner* — Michael P Mooney
(74) *Attorney, Agent, or Firm* — Kilpatrick Townsend & Stockton LLP

(57) ABSTRACT

A polarization-independent, optical circulator is formed in silicon photonics. The polarization-independent, optical circulator uses an optical splitter having two couplers and two waveguides joining the two couplers. One of the two waveguides is thinner than the other to create a large effective index difference between TE and TM modes transmitted through the one waveguide. Polarization rotators, including reciprocal and/or non-reciprocal rotators, are further used to create the optical circulator.

17 Claims, 6 Drawing Sheets

Related U.S. Application Data continuation-in-part of application No. 16/239,811, filed on Jan. 4, 2019, which is a division of application No. 15/246,925, filed on Aug. 25, 2016, now Pat. No. 10,209,448, which is a division of application No. 13/491,389, filed on Jun. 7, 2012, now Pat. No. 9,453,965.

(60) Provisional application No. 62/365,872, filed on Jul. 22, 2016, provisional application No. 61/494,871, filed on Jun. 8, 2011.

(51) Int. Cl.
   *G02F 1/09* (2006.01)
   *G02B 6/12* (2006.01)
   *G02B 6/126* (2006.01)

(58) Field of Classification Search
   CPC ... G02B 6/2746; G02B 6/29346; G02B 6/305
   See application file for complete search history.

(56) References Cited

U.S. PATENT DOCUMENTS

| | | |
|---|---|---|
| 5,138,687 A | 8/1992 | Horie et al. |
| 5,199,090 A | 3/1993 | Bell |
| 6,101,026 A | 8/2000 | Baney |
| 6,256,430 B1 | 7/2001 | Jin et al. |
| 6,275,625 B1 | 8/2001 | Bergmann |
| 6,535,656 B1 | 3/2003 | Noge et al. |
| 6,580,842 B1 | 6/2003 | Hehlen et al. |
| 7,065,265 B2 | 6/2006 | Hammer et al. |
| 7,269,317 B2 | 9/2007 | Blauvelt et al. |
| 7,701,985 B2 | 4/2010 | Webster et al. |
| 7,916,982 B1 | 3/2011 | Bahuguna et al. |
| 7,995,893 B2 | 8/2011 | Bi et al. |
| 8,150,219 B2 | 4/2012 | Nasu et al. |
| 8,222,084 B2 | 7/2012 | Dallesasse et al. |
| 8,478,083 B2 | 7/2013 | Little |
| 8,615,025 B2 | 12/2013 | Dallesasse et al. |
| 8,849,072 B2 | 9/2014 | Montoya et al. |
| 8,859,394 B2 | 10/2014 | Dallesasse et al. |
| 9,091,813 B2 | 7/2015 | Dallesasse et al. |
| 9,097,846 B2 | 8/2015 | Mizrahi et al. |
| 9,136,153 B2 | 9/2015 | Or-bach et al. |
| 9,316,785 B2 | 4/2016 | Krasulick et al. |
| 10,209,448 B2 | 2/2019 | Dallesasse et al. |
| 11,002,911 B2 | 5/2021 | Sodagar et al. |
| 2002/0181067 A1 | 12/2002 | Romanovsky et al. |
| 2003/0021514 A1 | 1/2003 | Ito et al. |
| 2003/0081873 A1 | 5/2003 | Tan et al. |
| 2003/0123783 A1 | 7/2003 | Miyata et al. |
| 2004/0005056 A1 | 1/2004 | Nishioka et al. |
| 2004/0085614 A1 | 5/2004 | Elezzabi et al. |
| 2004/0114872 A1 | 6/2004 | Nagai |
| 2004/0208614 A1 | 10/2004 | Price |
| 2004/0218870 A1 | 11/2004 | Blauvelt et al. |
| 2005/0069242 A1 | 3/2005 | Fujita et al. |
| 2005/0078913 A1 | 4/2005 | Blauvelt et al. |
| 2006/0002443 A1 | 1/2006 | Farber et al. |
| 2006/0013105 A1 | 1/2006 | Wada et al. |
| 2006/0018584 A1 | 1/2006 | Watts et al. |
| 2006/0097816 A1 | 5/2006 | Nagai |
| 2006/0165373 A1 | 7/2006 | Blauvelt et al. |
| 2006/0222283 A1 | 10/2006 | Salib et al. |
| 2007/0237450 A1 | 10/2007 | Blauvelt et al. |
| 2007/0237456 A1 | 10/2007 | Blauvelt et al. |
| 2007/0253661 A1 | 11/2007 | Black et al. |
| 2008/0019637 A1 | 1/2008 | Little et al. |
| 2008/0031566 A1 | 2/2008 | Matsubara et al. |
| 2008/0031572 A1 | 2/2008 | Blauvelt et al. |
| 2008/0080869 A1 | 4/2008 | Mitchell et al. |
| 2009/0110344 A1 | 4/2009 | Little et al. |
| 2009/0136191 A1 | 5/2009 | Bi et al. |
| 2010/0002988 A1 | 1/2010 | Yoshie et al. |
| 2010/0002989 A1 | 1/2010 | Tokushima |
| 2010/0046886 A1* | 2/2010 | Doerr ............ G02B 6/105 385/27 |
| 2010/0054753 A1 | 3/2010 | Futami et al. |
| 2010/0104237 A1 | 4/2010 | Nasu et al. |
| 2010/0238536 A1 | 9/2010 | Hu et al. |
| 2010/0316327 A1 | 12/2010 | Montoya et al. |
| 2011/0150384 A1 | 6/2011 | Nagarajan et al. |
| 2011/0293275 A1 | 12/2011 | Evans et al. |
| 2012/0063716 A1 | 3/2012 | Mizuno et al. |
| 2012/0121216 A1 | 5/2012 | Oh |
| 2013/0011093 A1 | 1/2013 | Goh et al. |
| 2013/0142475 A1 | 6/2013 | Dallesasse et al. |
| 2016/0111407 A1 | 4/2016 | Krasulick |
| 2017/0227709 A1 | 8/2017 | Lambert |

OTHER PUBLICATIONS

Zhang, et al., Silicon-Waveguide-Based Mode Evolution Polarization Rotator, IEEE Journal of Selected Topics in Quantum Electronics, vol. 16, No. 1, pp. 53-60, May 2010.

International Application No. PCT/US2017/043295 received an International Search Report and Written Opinion dated Oct. 20, 2017, 13 pages.

U.S. Appl. No. 13/491,360 received a Non-Final Office Action dated Nov. 6, 2014, 11 pages.

U.S. Appl. No. 13/491,360 received Notice of Allowance dated Mar. 30, 2015, 9, pages.

U.S. Appl. No. 13/491,389 received a Final Office Action dated Apr. 2, 2015, 9 pages.

U.S. Appl. No. 13/491,389 received a Final Office Action, dated Jul. 3, 2014, 10 pages.

U.S. Appl. No. 13/491,389 received a Non-Final Office Action dated Nov. 6, 2014, 11 pages.

U.S. Appl. No. 13/491,389 received a Non-Final Office Action dated Jan. 16, 2014, 8 pages.

U.S. Appl. No. 13/491,389 received a Non-Final Office Action dated May 24, 2016, 13 pages.

U.S. Appl. No. 13/491,389 received a Notice of Allowance, dated May 24, 2016, 13 pages.

U.S. Appl. No. 13/491,395 received a Final Office Action dated Oct. 29, 2014, 12 pages.

U.S. Appl. No. 13/491,395 received a Non-Final Office Action dated Jun. 20, 2014, 11 pages.

U.S. Appl. No. 13/491,395 received a Notice of Allowance, dated Jun. 22, 2015, 9 pages.

U.S. Appl. No. 15/246,925 received a Final Office Action, dated Apr. 12, 2018, 11 pages.

U.S. Appl. No. 15/246,925 received a Non-Final Office Action dated Aug. 3, 2017, 9 pages.

U.S. Appl. No. 15/246,925 received a Notice of Allowance dated Oct. 5, 2018, 9 pages.

U.S. Appl. No. 15/656,331 received a Final Office Action dated Jul. 24, 2020, 13 pages.

U.S. Appl. No. 15/656,331 received a Non-Final Office Action dated Jan. 24, 2019, 12 pages.

U.S. Appl. No. 15/656,331 received a Notice of Allowance dated Jan. 12, 2021, 9 pages.

U.S. Appl. No. 16/239,811 received a Final Office Action dated Jan. 11, 2021, 12 pages.

U.S. Appl. No. 16/239,811 received a Non-Final Office Action dated May 7, 2020, 15 pages.

U.S. Appl. No., 16/239,811 received a Notice of Allowance dated Oct. 5, 2021, 8 pages.

* cited by examiner

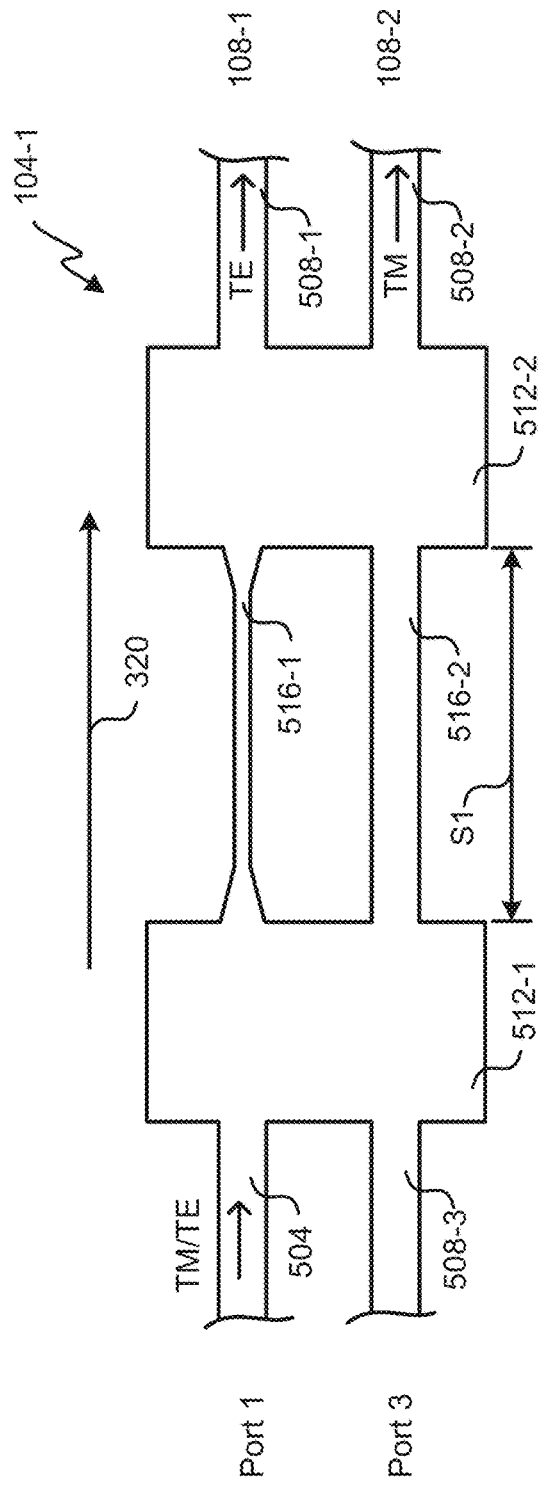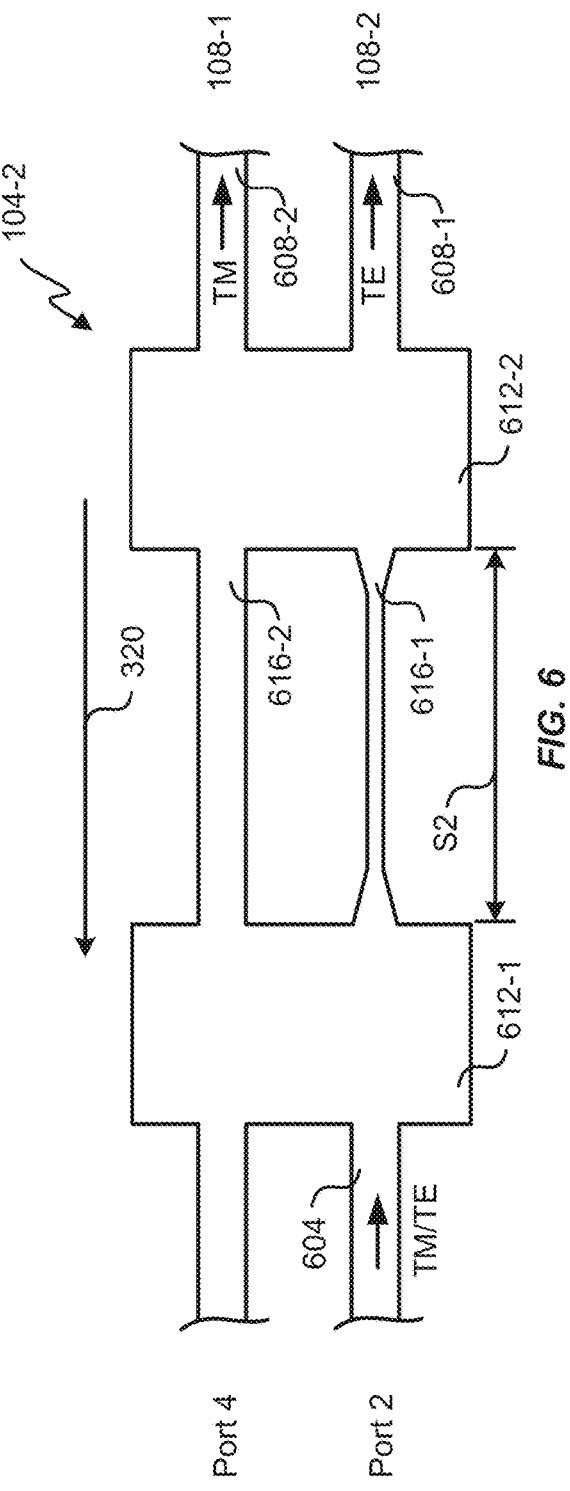

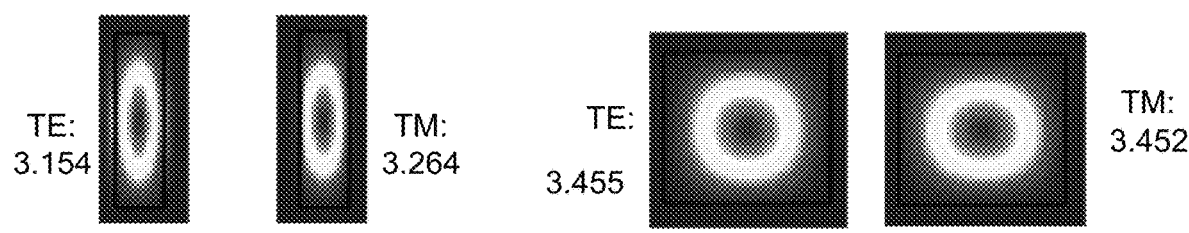
FIG. 7A  FIG. 7B  FIG. 8A  FIG. 8B
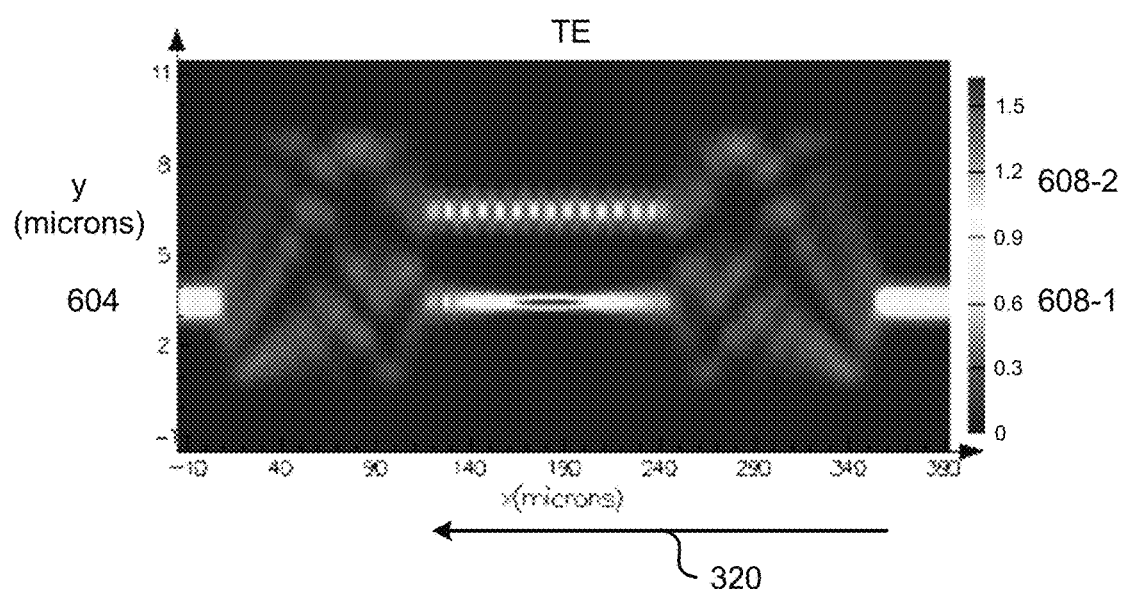
FIG. 9A
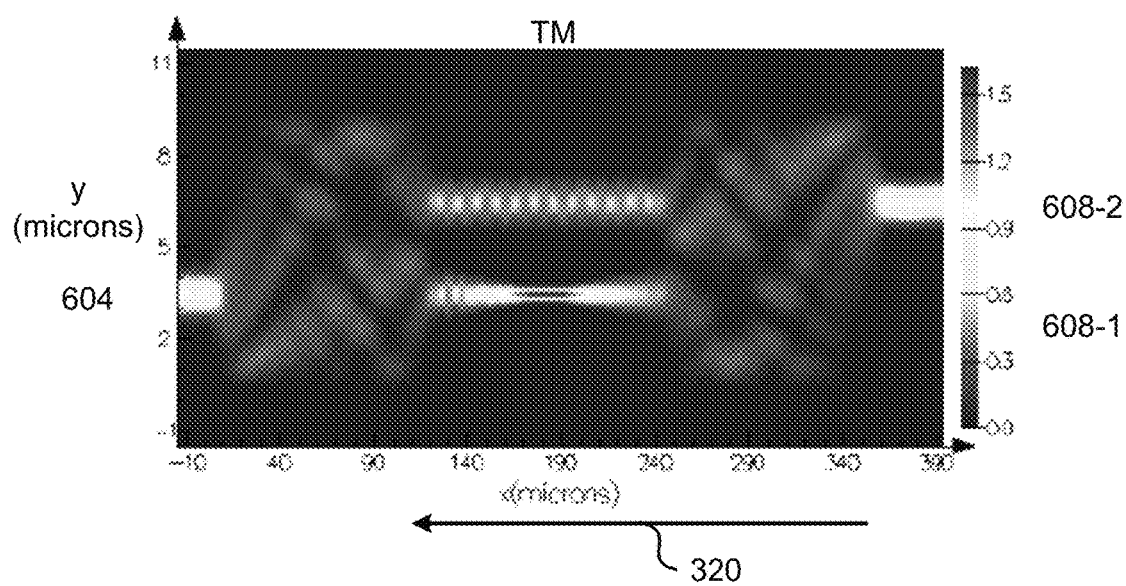
FIG. 9B

MONOLITHICALLY-INTEGRATED, POLARIZATION-INDEPENDENT CIRCULATOR

CROSS REFERENCE TO RELATED APPLICATIONS

This application is a continuation of U.S. patent application Ser. No. 15/656,331, filed on Jul. 21, 2017, entitled "Monolithically-Integrated, Polarization-Independent Circulator," which application claims priority to U.S. Provisional Application No. 62/365,872, filed on Jul. 22, 2016, the disclosure of which is incorporated by reference in its entirety for all purposes.

This application is also a continuation-in-part application of U.S. patent application Ser. No. 16/239,811, filed on Jan. 4, 2019, entitled "Systems And Methods For Photonic Polarization Rotators," which application is a divisional of U.S. patent application Ser. No. 15/246,925, filed on Aug. 25, 2016, entitled "Systems And Methods For Photonic Polarization Rotators," now U.S. Pat. No. 10,209,448, issued on Feb. 19, 2019, which application is a divisional of U.S. patent application Ser. No. 13/491,389, filed on Jun. 7, 2012, entitled "Systems And Methods For Photonic Polarization Rotators," now U.S. Pat. No. 9,453,965, issued on Sep. 27, 2016, which application claims the benefit of U.S. Provisional Patent Application No. 61/494,871, filed on Jun. 8, 2011, entitled "Method And System For Silicon Photonic Polarization Control," the disclosures of which are hereby incorporated by reference in their entirety for all purposes.

The following U.S. Patent Applications are related and the entire disclosures of each are incorporated by reference into this application for all purposes: U.S. patent application Ser. No. 13/491,360, filed on Jun. 7, 2012, entitled "Systems And Methods For Photonic Polarization Beam Splitters," now U.S. Pat. No. 9,091,813, issued on Jul. 28, 2015; and U.S. patent application Ser. No. 13/491,395, filed on Jun. 7, 2012, entitled "Systems And Methods For Photonic Polarization-Separating Apparatuses For Network Applications," now U.S. Pat. No. 9,170,373, issued on Oct. 27, 2015.

BACKGROUND

This application relates to optical isolators and circulators. More specifically, and without limitation, this application relates to optical isolators and circulators in semiconductor materials, including silicon photonics.

Optical circulators have been used in fiber optics to separate light traveling opposite directions. Optical circulators can be three-port or four-port devices. Light entering port 1 exits port 2 and light entering port 2 exits port 3, not port 1. Optical circulators are considered non-reciprocal optical devices. A non-reciprocal optical device is a device where properties of light passing through the device in a forward direction are not reversed when light passes through the device in a backward direction.

BRIEF SUMMARY

This disclosure introduces systems and methods to integrate on-chip circulators and/or isolators. In some embodiments, the circulators and/or isolators are formed using Skorpios' silicon photonics platform. Examples of silicon-based, polarization rotators are disclosed in U.S. patent application Ser. No. 13/491,395, filed on Jun. 7, 2012, the disclosure of which is incorporated by reference for all purposes. Examples of Skorpios' silicon photonics platform are given in U.S. application Ser. No. 14/509,914, filed on Oct. 8, 2014, the disclosure of which is incorporated by reference for all purposes.

In some embodiments, circulators and isolators are polarization insensitive, i.e., they work with all states of polarization. In some embodiments, a circulator comprises polarization splitters, non-reciprocal polarization rotators, and reciprocal rotators.

In some embodiments, a device for a semiconductor-waveguide, polarization-independent, optical isolator and/or circulator comprises: an input; a first output; a second output; a first coupler optically coupled with the input; a second coupler optically coupled with the first output and the second output; a first waveguide optically coupling the first coupler with the second coupler, wherein the first waveguide has a first geometry; and/or a second waveguide optically coupling the first coupler with the second coupler, wherein: the second waveguide has a second geometry and the second geometry is different from the first geometry. In some embodiments, the first geometry is different from the second geometry by the first waveguide having a cross-sectional width that is narrower than a cross-sectional width of the second waveguide; the first geometry is different from the second geometry by the first waveguide having a cross-sectional height that is shorter than a cross-sectional height of the second waveguide; the first geometry is different from the second geometry by the first waveguide having a cross-sectional dimension that is less than a cross-sectional dimension of the second waveguide; cross-sectional dimension is measured in a direction orthogonal to a direction of beam propagation; the first coupler is separated from the second coupler by a distance between 80 and 250 microns, or between 100 and 200 microns; the first waveguide has a thickness between 1.0 and 2.5 microns, measured in a direction orthogonal to beam propagation; the input, the first output, the second output, the first coupler, the second coupler, the first waveguide, and the second waveguide are integrated on a silicon substrate; the input, the first output, the second output, the first coupler, the second coupler, the first waveguide, and the second waveguide are part of a first polarization splitter; the device further comprises: a second polarization splitter, a first path optically coupling the first polarization splitter with the second polarization splitter, wherein the first path optically couples with the first output, a second path optically coupling the first polarization splitter with the second polarization splitter, wherein the second path optically couples with the second output, a first port optically coupled with the first polarization splitter, wherein the first port is the input, a second port optically coupled with the second polarization splitter, a first non-reciprocal polarization rotator in the first path between the first polarization splitter and the second polarization splitter, a second non-reciprocal polarization rotator in the second path between the first polarization splitter and the second polarization splitter, a first reciprocal polarization rotator in the first path between the first polarization splitter and the second polarization splitter, and/or a second reciprocal polarization rotator in the second path between the first polarization splitter and the second polarization splitter; and/or the first geometry is different from the second geometry by the first geometry comprising a taper and the second geometry not comprising a taper.

In some embodiments, a method of using a device for a polarization-independent, optical isolator and/or circulator comprises: transmitting an optical beam to an input, wherein the input is optically coupled with a first coupler; separating, using the first coupler, the optical beam into a first portion and a second portion; transmitting the first portion through a first waveguide to a second coupler; transmitting the second portion through a second waveguide to the second coupler, wherein the second waveguide has a different geometry than the first waveguide; interfering, at the second coupler, the first portion of the optical beam with the second portion of the optical beam to separate a TE component of the optical beam from a TM component of the optical beam; transmitting the TE component of the optical beam to a first output, wherein the first output is optically coupled with the second coupler; and/or transmitting the TM component of the optical beam to a second output, wherein the second output is optically coupled with the second coupler. In some embodiments, the second waveguide has a different geometry than the first waveguide by the first waveguide having a cross-sectional dimension that is less than a cross-sectional dimension of the second waveguide; cross-sectional dimension is measured in a direction orthogonal to a direction of beam propagation; the first coupler is separated from the second coupler by a distance between 80 and 250 microns, or between 100 and 200 microns; and/or the input, the first output, the second output, the first coupler, the second coupler, the first waveguide, and the second waveguide are integrated on a silicon substrate. In some embodiments, the method further comprises transmitting the first portion of the optical beam through a taper section of the first waveguide.

In some embodiments, a device comprises: a first coupler, a second coupler, a first waveguide coupling the first coupler with the second coupler, and/or a second waveguide coupling the first coupler with the second coupler; a second polarization splitter; a first path optically coupling the first polarization splitter with the second polarization splitter; a second path optically coupling the first polarization splitter with the second polarization splitter; a first port optically coupled with the first polarization splitter; a second port optically coupled with the second polarization splitter; a first non-reciprocal polarization rotator in the first path between the first polarization splitter and the second polarization splitter; a second non-reciprocal polarization rotator in the second path between the first polarization splitter and the second polarization splitter; a first reciprocal polarization rotator in the first path between the first polarization splitter and the second polarization splitter; and/or a second reciprocal polarization rotator in the second path between the first polarization splitter and the second polarization splitter. In some embodiments, the first waveguide has a first geometry, the second waveguide has a second geometry, the first geometry is different from the second geometry by the first waveguide having a cross-sectional dimension that is less than a cross-sectional dimension of the second waveguide, and/or cross-sectional dimension is measured in a direction orthogonal to a direction of beam propagation; the first coupler is separated from the second coupler by a distance between 80 and 250 microns, or between 100 and 200 microns; the first coupler, the second coupler, the first waveguide, and the second waveguide, the second polarization splitter, the first non-reciprocal polarization rotator, and the second non-reciprocal polarization rotator are integrated on a silicon substrate; and/or the first waveguide has a thickness between 1.0 and 2.5 microns, measured in a direction orthogonal to beam propagation. In some embodiments, the device comprises: an input optically coupled with the first coupler, a first output optically coupling the second coupler with the first path, and/or a second output optically coupling the second coupler with the second path.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 5 depicts an embodiment of the first polarization splitter.

FIG. 6 depicts an embodiment of the second polarization splitter.

FIGS. 7A and 7B depict optical modes in an embodiment of the first waveguide.

FIGS. 8A and 8B depict optical modes in an embodiment of the second waveguide.

FIGS. 9A and 9B depict power of optical modes in an embodiment of the second splitter.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
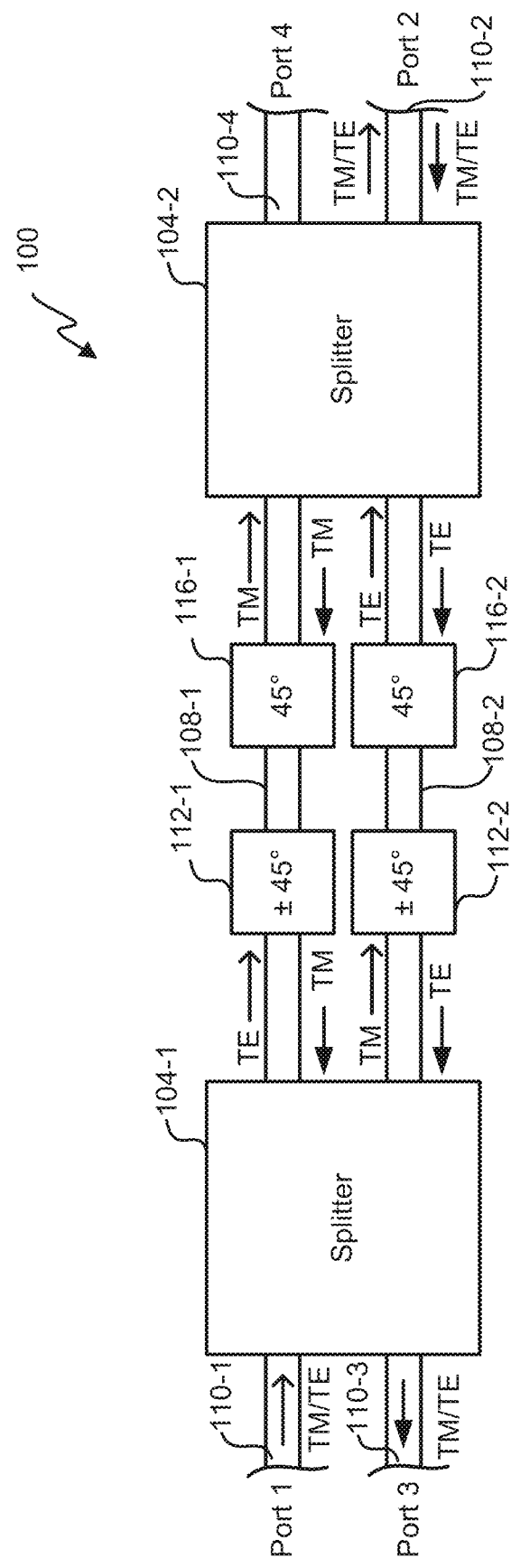
FIG. 1 depicts a diagram of an embodiment of an optical circulator.

FIG. 1 depicts a simplified diagram of an embodiment of an optical circulator 100. The optical circulator comprises a first splitter 104-1; a second splitter 104-2; a first path 108-1 optically coupling the first splitter 104-1 with the second splitter 104-2; a second path 108-2 optically coupling the first splitter 104-1 with the second splitter 104-2; a first port 110-1 optically coupled with the first splitter 104-1; a second port 110-2 optically coupled with the second splitter 104-2; a first non-reciprocal polarization rotator 112-1 in the first path 108-1 between the first splitter 104-1 and the second splitter 104-2; a second non-reciprocal polarization rotator 112-2 in the second path 108-2 between the first splitter 104-1 and the second splitter 104-2; a first reciprocal polarization rotator 116-1 in the first path 108-1 between the first splitter 104-1 and the second splitter 104-2; a second reciprocal rotator 116-2 in the second path 108-2 between the first splitter 104-1 and the second splitter 104-2; and a third port 110-3 optically coupled with the first splitter 104-1. In some embodiments, a forth port 110-4 is optically coupled with the second splitter 104-2. The splitters 104 separate TE (transverse electric)-polarized light from TM (transverse magnetic)-polarized light. The components are integrated on a substrate (e.g., a silicon substrate).

Light from the first port 110-1 (port 1) is transmitted to the second port 110-2 (port 2). Light from the second port 110-2 is transmitted to the third port 110-3 (port 3). For an optical isolator, port 3 is not used. The optical circulator 100 is polarization insensitive, i.e., it works with all states of polarization. In some embodiments, the splitter 104 comprises one or more multi-mode interference (MMI) couplers.

In some embodiments, a method for using the optical circulator 100 comprises transmitting light into the first port 110-1, splitting the light into TE and TM components using the first splitter 104-1, rotating both the TE and TM components (e.g., by 90 degrees), and combining the TE and TM components at the second splitter 104-2 to output through the second port 110-2. In some embodiments, a method for using the optical circulator 100 comprises transmitting light into the second port 110-2, splitting the light into TE and TM components, rotating the TE and TM components by 45 degrees and by −45 degrees (no net change in polarization), and combining the TE and TM components to output through the third port 110-3.

In some embodiments, the optical circulator 100 is monolithically integrated on a silicon photonics chip (e.g., on a silicon-on-insulator (SOI) substrate). In some embodiments, embedded latching garnet material is integrated on an SOI wafer (e.g., in a pit of the SOI wafer) using a fabrication process similar to a process disclosed in '914 application (e.g., by depositing a garnet chip in an SOI pit instead of a III-V chip). In some embodiments, the optical circulator 100 has all passive components (e.g., zero power consumption). The optical circulator 100 is polarization insensitive. In some embodiments, the non-reciprocal polarization rotators 112 are Faraday rotators.

Figure 2:
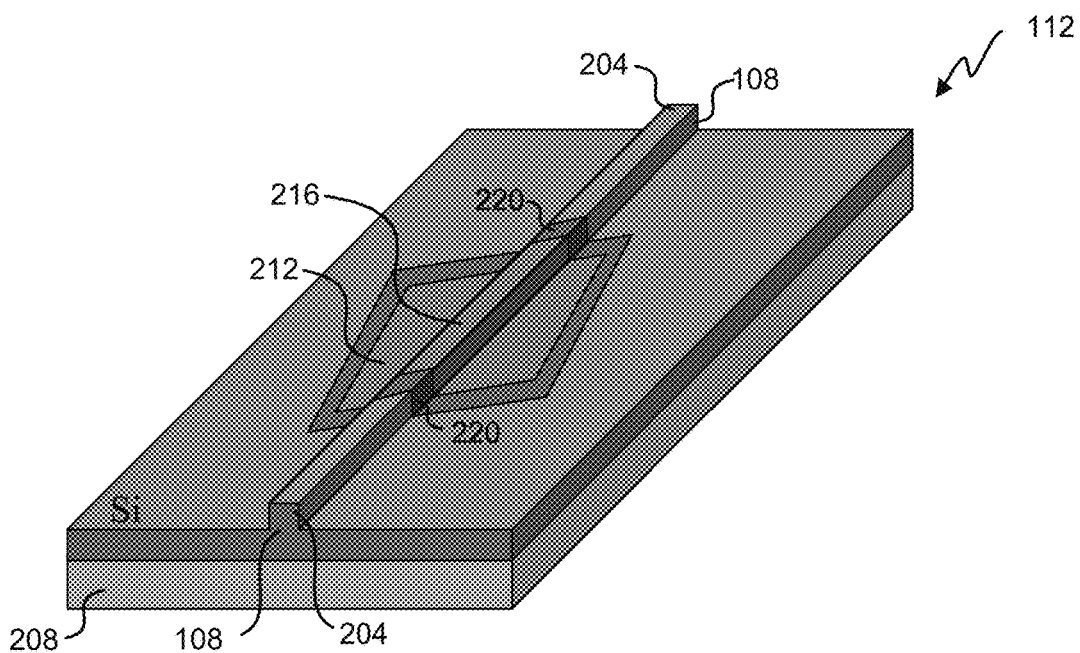
FIG. 2 depicts a diagram of an embodiment of a non-reciprocal rotator.

FIG. 2 depicts a simplified diagram of an embodiment of a non-reciprocal polarization rotator 112. The non-reciprocal polarization rotator 112 is in the path 108 between the first splitter 104-1 and the second splitter 104-2. In some embodiments, the path 108 comprises a platform waveguide 204. The platform waveguide 204 is used to confine an optical mode of an optical beam transmitted from the first splitter 104-1 to the second splitter 104-2. In some embodiments, the platform waveguide 204 is a ridge waveguide. In some embodiments, the platform waveguide 204 comprises silicon (Si). In some embodiments, the platform waveguide 204 comprises crystalline silicon. In some embodiments, the platform waveguide 204 is formed in crystalline silicon. In some embodiments, when the term "waveguide" is used the term is referring to a waveguide core, and not to cladding. For example, in the embodiment shown in FIG. 2, a lower cladding 208 (e.g., insulating layer of an SOI substrate; and/or $SiO_2$) helps confine light in the platform waveguide 204. An upper cladding is not shown, but could be air or some material (e.g., $SiO_2$).

The non-reciprocal polarization rotator 112 comprises rotator material 212. In some embodiments, the rotator material 212 is garnet (e.g., latching garnet and/or MGL garnet). In some embodiments, the rotator material 212 is magneto-optical (MO) material. In some embodiments, a rotator waveguide 216 (e.g., a ridge) is formed in the rotator material 212 (e.g., by etching the rotator material 212). The rotator waveguide 216 is optically aligned with the platform waveguide 204. Polarization is rotated by +45° or −45° depending on a direction of beam propagation. The rotator waveguide 216 is optically coupled with the platform waveguide 204 using an optical bridge 220. Examples of forming the optical bridge 220 are disclosed in U.S. patent application Ser. No. 13/597,117, filed on Aug. 28, 2012; and U.S. patent application Ser. No. 15/426,366, filed on Feb. 7, 2017, the disclosures of which are incorporated by reference for all purposes. MGL garnet provides 93 degree/mm polarization rotation at 1550 nm wavelength. Thus, in some embodiments, for 45-degree rotation, the rotator material 212 is 480 µm long (in a direction along beam propagation). In some embodiments, the rotator material 212 is integrated onto an SOI wafer at many locations (e.g., 2 to 500), and then processed on wafer scale. Examples of wafer-scale bonding are given in U.S. Pat. No. 8,859,394, issued on Oct. 14, 2014, and U.S. patent application Ser. No. 14/862,435, filed on Sep. 23, 2015, the disclosures of which are incorporated by reference for all purposes.

In some embodiments, thick silicon is used. In some embodiments, waveguides in thick silicon are used to increase coupling between waveguides. In some embodiments, thick is a waveguide having a core height between 0.8 and 7 µm, between 1.0 and 5 µm, and/or between 1.3 to 3 µm. In some embodiments, garnet (poled permanently) is used so the circulator is passive (i.e., little or no power consumption), and/or is symmetrical.

Figure 3:
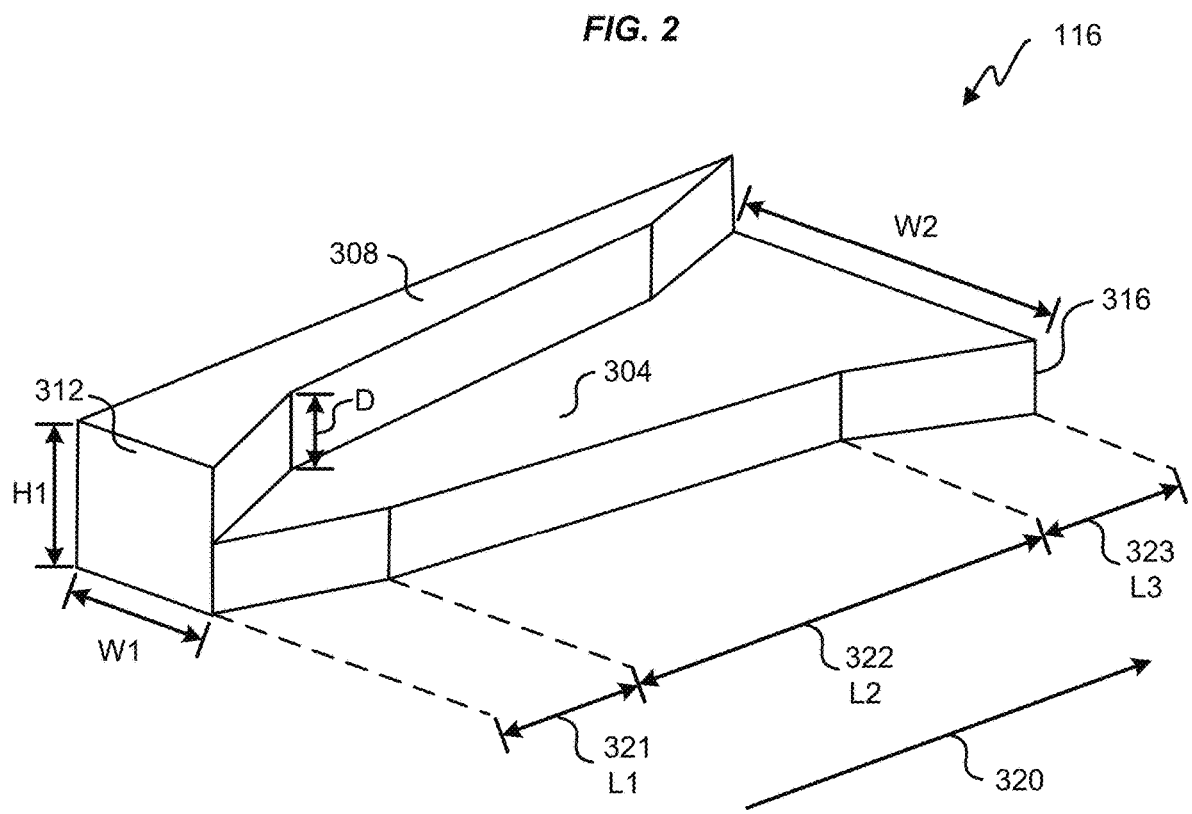
FIG. 3 depicts a diagram of an embodiment of a reciprocal polarization rotator.

FIG. 3 depicts a diagram of an embodiment of a reciprocal polarization rotator 116. The reciprocal polarization rotator 116 is in the path 108 between the first splitter 104-1 and the second splitter 104-2. The reciprocal polarization rotator 116 comprises a lower portion, referred to as a shoulder 304, and an upper portion, referred to as a ridge 308. The reciprocal polarization rotator comprises an entrance 312 and an exit 316. In forward beam propagation 320, light is guided from the entrance 312 to the exit 316. In some embodiments, forward beam propagation 320 is from the first splitter 104-1 to the second splitter 104-2. The entrance 312 and the exit 316 are both optically coupled with the platform waveguide 204. In some embodiments, forming the reciprocal polarization rotator 116 overlaps with forming the platform waveguide 204. In some embodiments, the reciprocal polarization rotator 116 is formed concurrently with forming the platform waveguide 204.

In a direction of forward beam propagation 320 (e.g., from the first splitter 104-1 to the second splitter 104-2) the shoulder 304 widens and the ridge 308 narrows. In some embodiments, the reciprocal polarization rotator 116 uses multi-stage tapers to rotate light polarization. In some embodiments, 90° rotation, with polarization extinction ratio (PER) ~20 dB, is achieved with a length of ~3 mm. Forty-five degree rotation can be achieved with shorter lengths (e.g., 1 to 1.5 mm). In some embodiments, a reciprocal polarization rotator 116 is used in other applications than in a circulator (e.g., the reciprocal polarization rotator 116 is used for 90° rotation).

Thick silicon (e.g., equal to or greater than 1.0, 1.2, or 1.5 µm and/or equal to or less than 1.5, 1.7, 2.0, or 3 µm) is often more difficult to create polarization rotators in because thick silicon polarization rotator lengths are sometimes longer (e.g., more loss) than thin silicon polarization rotators. In some embodiments, to reduce a length of the reciprocal polarization rotator 116, the reciprocal polarization rotator 116 (wherein length of the reciprocal polarization rotator 116 is measured from the entrance 312 to the exit 316, along the direction of forward beam propagation 320) comprises a first stage 321, a second stage 322, and a third stage 323. The second stage 322 is between the first stage 321 and the third stage 323. The first stage 321 and the third stage 323 have tapers with greater slopes than the second stage 322. Polarization rotation occurs primarily in the second stage 322. The first stage 321 and the third stage 323 have tapers with higher slopes than the second stage 322 to shorten the length of the reciprocal polarization rotator 116 as compared to a rotator with a single, linear taper. In some embodiments, instead of, or in addition to, having multiple taper stages, tapers based on function shapes are used (e.g., a function having a steeper slope at ends than in the middle, such as a cosine taper or a parabolic taper).

The entrance 312 has a first height H1 and a first width W1. Height and width are measured orthogonal to the direction of forward beam propagation 320. The exit 316 has a second height H2 and a second width W2. In FIG. 3, H2=H1. In some embodiments, H2<H1 (e.g., the ridge 308 stops before the exit 316. In some embodiments, the ridge 308 has a minimum width equal to or greater than 0.09 μm and equal to or less than 0.3 μm. W2 is greater than W1.

The ridge 308 is etched to a depth D to form the shoulder 304. The first stage 321 is defined by a first length L1, the second stage 322 is defined by a second length L2, and the third stage is defined by a third length L3. Table I below provides ranges and example values of dimensions of an embodiment of the reciprocal polarization rotator 116.

TABLE I

Dimensions of an embodiment of a reciprocal polarization rotator 116

| Dimension | Range (μm) | Example Values (μm) |
|---|---|---|
| D | 0.3-0.8 | 0.45, 0.5 |
|   | 0.45-0.65 | 0.55, 0.6 |
| W1 | 0.6-2.0 | 0.8, 0.85 |
|   | 0.8-1.1 | 0.90, 0.95 |
|   |   | 1.0, 1.05 |
| W2 | 1.0-2.5 | 1.4, 1.5 |
|   | 1.3-1.7 | 1.6 |
| H1 | 1.0-2.5 | 1.4, 1.5 |
|   | 1.3-1.7 | 1.6 |
| H2 | (H1 − D) ≤ H2 ≤ H1 | 0.95, 1.0 |
|   | 0.5-2.5 | 1.4, 1.5 |
|   | 1.3-1.7 | 1.6 |
| L1 | 0-1000 | 400, 500, 600 |
| L2 | 500-5000 | 1500, 2000 |
|   | 1500-2500 | 2500 |
| L3 | 0-1000 | 400, 500, 600 |

Figure 4:
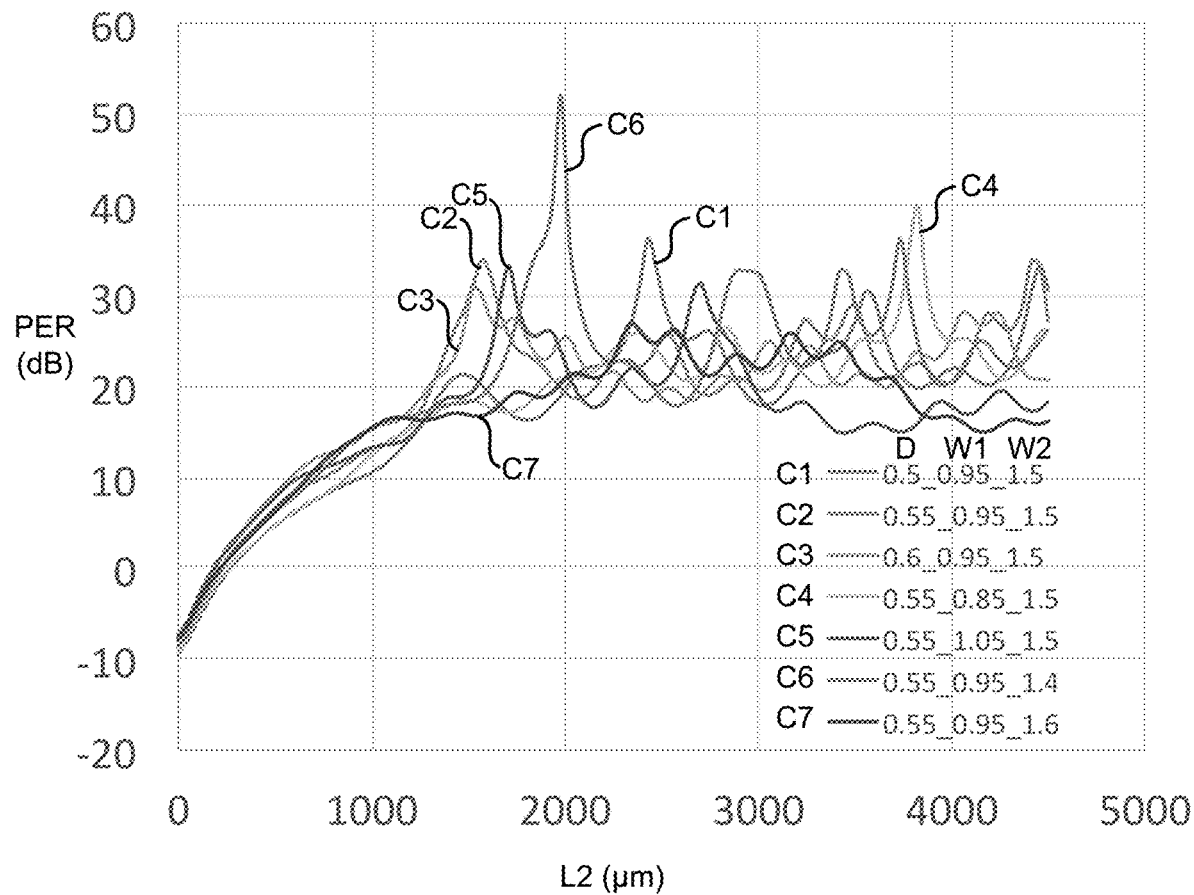
FIG. 4 depicts simulated polarization extinction ratio (PER) verses a length of a reciprocal polarization rotator.

FIG. 4 depicts simulated polarization extinction ratio (PER) versus the second length L2 of the second stage 322 for several different configurations. For 20 dB PER, the second length L2 is about 2000 μm. For 45-degree rotation, the second length L2 can be reduced (e.g., reduced to half). Table II below lists configurations simulated in FIG. 4.

TABLE II

Sample configurations of a reciprocal polarization rotator 116

| Configuration | D | W1 | W2 |
|---|---|---|---|
| C1 | 0.5 | 0.95 | 1.5 |
| C2 | 0.55 | 0.95 | 1.5 |
| C3 | 0.6 | 0.95 | 1.5 |
| C4 | 0.55 | 0.85 | 1.5 |
| C5 | 0.55 | 1.05 | 1.5 |
| C6 | 0.55 | 0.95 | 1.4 |
| C7 | 0.55 | 0.95 | 1.6 |

FIG. 5 depicts an embodiment of the first splitter 104-1. The first splitter 104-1 comprises an input 504, a first output 508-1, a second output 508-2, a first coupler 512-1, a second coupler 512-2, a first waveguide 516-1, and a second waveguide 516-2. The first coupler 512-1 is optically coupled with the input 504. The first waveguide 516-1 optically couples the first coupler 512-1 with the second coupler 512-2. The second waveguide 516-2 optically couples the first coupler 512-1 with the second coupler 512-2. The second coupler 512-2 is optically coupled with the first output 508-1 and the second output 508-2. In some embodiments, the coupler 512 is a 3 dB couplers. In some embodiments the couplers 512 are separated by a first distance S1. In some embodiments, S1 is from 50-500, 75-300, 80-250, and/or 100-200 μm. A coupler 512 is an optical device that receives light from one or more inputs and couples that light into one or more outputs, wherein a number of inputs and/or a number of outputs is two or more (e.g., coupling 2 to 1 or 1 to 2).

An optical beam is transmitted from the input 504 to the first coupler 512-1. The optical beam is separated into a first portion and a second portion at the first coupler 512-1. The first portion of the optical beam is transmitted through the first waveguide 516-1 to the second coupler 512-2. The second portion of the optical beam is transmitted through the second waveguide 516-2 to the second coupler 512-2. The geometry of the first waveguide 516-1 is different from the geometry of the second waveguide 516-2. The first portion of the optical beam experiences a different effective refractive index than the second portion of the optical beam. In some embodiments, the first geometry is different from the second geometry to create a refractive index difference between TE and TM modes in a waveguide 516 (e.g., between 0.05 and 0.2, 0.08 and 0.15, and/or 0.1±5%, 10% and/or 20%). In some embodiments, the polarization splitter is less than 500 μm long; insertion loss is less than 0.5 dB; and/or PER >30 dB. In the second coupler 512-2 the first portion of the optical beam interferes with the second portion of the optical beam such that a TE component of the optical beam is separated from a TM component of the optical beam. The TE component of the optical beam is transmitted to the first output 508-1 and the TM component of the optical beam is transmitted to the second output 508-2

In some embodiments, the first geometry is different from the second geometry by the first waveguide 516-1 having a cross-sectional width that is narrower than a cross-sectional width of the second waveguide 516-2. For example, the cross-sectional width of the first waveguide 516-1 has a minimum width between 0.5 and 1.5 μm, not including a ridge portion of the first waveguide 516-1; and the cross-sectional width of the second waveguide 516-2 has a minimum width between 1.0 and 2.5 μm, not including a ridge portion of the second waveguide 516-2.

In some embodiments, the first geometry is different from the second geometry by the first waveguide 516-1 having a cross-sectional height that is shorter than a cross-sectional height of the second waveguide 516-2. In some embodiments, the waveguide 516 has similar dimensions as D, H1, H2, W1, and/or W2. Heights and widths are measured orthogonal to a direction of beam propagation. In some embodiments, the first waveguide 516-1 and/or the second waveguide 516-2 has a thickness, measured in a vertical direction where a substrate defines a horizontal plane, between 1.0 and 2.5 μm. In some embodiments, the input 504, the first output 508-1, the second output 508-2, the first coupler 512-1, the second coupler 512-2, the first waveguide 516-1, and the second waveguide 516-2 are integrated on a silicon substrate (e.g., formed in a device layer of an SOI wafer). In some embodiments, the input 504, the first output 508-1, the second output 508-2, the first coupler 512-1, the second coupler 512-2, the first waveguide 516-1, and/or the second waveguide 516-2 are formed of crystalline silicon.

The input 504 is optically coupled with the first port 110-1. The first output 508-1 is optically coupled with the first path 108-1. The second output 508-2 is optically coupled with the second path 108-2. In some embodiments, the first coupler 512-1 is optically coupled with a third output 508-3. For example, the third output 508-3 is optically coupled with port 3 and used to output an optical beam propagating in a direction reverse of the forward beam propagation 320.

FIG. 6 depicts an embodiment of the second polarization splitter 104-2. The second splitter 104-2 comprises an input 604, a first output 608-1, a second output 608-2, a first coupler 612-1, a second coupler 612-2, a first waveguide 616-1, and a second waveguide 616-2. The first coupler 612-1 is optically coupled with the input 604. The first waveguide 616-1 optically couples the first coupler 612-1 with the second coupler 612-2. The second waveguide 616-2 optically couples the first coupler 612-1 with the second coupler 612-2. The second coupler 612-2 is optically coupled with the first output 608-1 and the second output 608-2. In some embodiments the coupler 612 is a 3 dB coupler. In some embodiments the couplers 612 are separated by a second distance S2. In some embodiments, S2 is from 50-500, 75-300, 80-250, and/or 100-200 µm. In some embodiments S2 equals S1. In some embodiments, S2 doesn't equal S1. A coupler 612 is an optical device that receives one or more inputs and couples light into one or more outputs, wherein the inputs and outputs don't both equal one (e.g., coupling 2 to 1 or 1 to 2).

An optical beam is transmitted from the input 604 to the first coupler 612-1. The optical beam is separated into a first portion and a second portion at the first coupler 612-1. The first portion of the optical beam is transmitted through the first waveguide 616-1 to the second coupler 612-2. The second portion of the optical beam is transmitted through the second waveguide 616-2 to the second coupler 612-2. Since the first geometry of the first waveguide 616-1 is different from the second geometry of the second waveguide 616-2, the first portion of the optical beam experiences a different effective refractive index than the second portion of the optical beam. In some embodiments, the first geometry is different from the second geometry to create a refractive index difference between TE and TM modes in one waveguide that is different than a refractive index difference between TE and TM modes in another waveguide (e.g., a high refractive index difference in the first waveguide 616-1 between 0.05 and 0.2, 0.08 and 0.15, and/or 0.1±5%, 10% and/or 20%; and/or a low refractive index difference in the second waveguide 616-2 between 0 and 0.01). In some embodiments, the polarization splitter is less than 500 µm long and/or longer than 100 µm long; insertion loss is less than 0.5 dB; and/or PER greater than 30 dB and/or less than 50 dB or 100 dB. In the second coupler 612-2, the first portion of the optical beam interferes with the second portion of the optical beam such that a TE component of the optical beam is separated from a TM component of the optical beam. The TE component of the optical beam is transmitted to the first output 608-1 and the TM component of the optical beam is transmitted to the second output 608-2

In some embodiments, the first geometry is different from the second geometry by the first waveguide 616-1 having a cross-sectional width that is narrower than a cross-sectional width of the second waveguide 616-2. For example, the cross-sectional width of the first waveguide 616-1 has a minimum width between 0.5 and 1.5 µm, not including a ridge portion of the first waveguide 616-1; and the cross-sectional width of the second waveguide 616-2 has a minimum width between 1.0 and 2.5 µm, not including a ridge portion of the second waveguide 616-2.

In some embodiments, the first geometry is different from the second geometry by the first waveguide 616-1 having a cross-sectional height that is shorter than a cross-sectional height of the second waveguide 616-2. In some embodiments, the waveguide 616 has similar dimensions as D, H1, H2, W1, and/or W2. Heights and widths are measured orthogonal to a direction of beam propagation. In some embodiments, the first waveguide 616-1 and/or the second waveguide 616-2 has a height, measured in a vertical direction where a substrate defines a horizontal plane, between 1.0 and 2.5 µm. In some embodiments, the input 604, the first output 608-1, the second output 608-2, the first coupler 612-1, the second coupler 612-2, the first waveguide 616-1, and the second waveguide 616-2 are integrated on a silicon substrate (e.g., formed in a device layer of an SOI wafer). In some embodiments, the input 604, the first output 608-1, the second output 608-2, the first coupler 612-1, the second coupler 612-2, the first waveguide 616-1, and/or the second waveguide 616-2 formed of crystalline silicon.

Though FIG. 6 is similar to FIG. 5 in some ways, there are some differences. FIG. 6 from left to right is a direction reverse of the forward beam propagation 320, whereas FIG. 5 from left to right is in the direction of forward beam propagation. The input 604 is optically coupled with port 2. The first output 608-1 is optically coupled with the second path 108-2. The second output 608-2 is optically coupled with the first path 108-1. The first waveguide 616-1 of the second splitter 104-2 is in line with the second path 108-2, whereas the first waveguide 516-1 of the first splitter 104-1 is in line with the first path 108-2.

FIG. 7 depicts optical modes in an embodiment of the first waveguide 516-1 and/or 616-1. FIG. 7 is a cross section of the first waveguide 516-1 and/or 616-1. FIG. 7A shows a simulated TE mode in the first waveguide 516-1 and/or 616-1. The effective refractive index of the TE mode in the first waveguide 516-1 and/or 616-1 is 3.154. FIG. 7B shows a simulated TM mode in the first waveguide 516-1 and/or 616-1. The effective refractive index of the TM mode in the first waveguide 516-1 and/or 616-1 is 3.264. The effective refractive index difference between the TE mode and the TM mode in the first waveguide is 3.264−3.154=0.11.

FIG. 8 depicts optical modes in an embodiment of the second waveguide 516-2 and/or 616-2. FIG. 8A shows a simulated TE mode in the second waveguide 516-2 and/or 616-2. The effective refractive index of the TE mode in the second waveguide 516-2 and/or 616-2 is 3.455. FIG. 8B shows a simulated TM mode in the second waveguide 516-2 and/or 616-2. The effective refractive index of the TM mode in the second waveguide 516-2 and/or 616-2 is 3.452. The effective refractive index difference between the TE mode and the TM mode in the second waveguide is 3.455−3.452=0.003. In FIGS. 7 and 8, the highest intensity of the optical beam is in a center of the waveguide 516 and/or 616.

FIG. 9 depicts optical modes in an embodiment of the second splitter 104-2. FIG. 9A depicts a simulation of an embodiment of TE-polarized light in the second splitter 104-2. TE-polarized light propagates from input 604 to the first output 608-1. FIG. 9B depicts a simulation of an embodiment of TM-polarized light in the second splitter 104-2. TM-polarized light propagates from input 604 to the second output 608-2.

The more narrow a width of the first waveguide 516-1 and/or 616-1, the larger the index difference between modes. However, there is a tradeoff between creating a larger index difference and fabrication tolerances. The larger the refractive index difference, the shorter S1 or S2 can be. In some embodiments, a width of the second waveguide 616-2 is 2 μm; and/or a width of the first waveguide 616-1 is between 0.3 and 1.5 μm (e.g., 0.5, 1.0 μm) as a good tradeoff between polarization splitter length and ease of fabrication.

$$\Delta\psi_{TE,1} - \Delta\psi_{TE,2} = \frac{2\pi(n_{TE1} - n_{TE2})L}{\lambda} = 2m\pi$$

$$\Delta\psi_{TM,1} - \Delta\psi_{TM,2} = \frac{2\pi(n_{TM1} - n_{TM2})L}{\lambda} = 2(n+1)\pi$$

Figure 10:
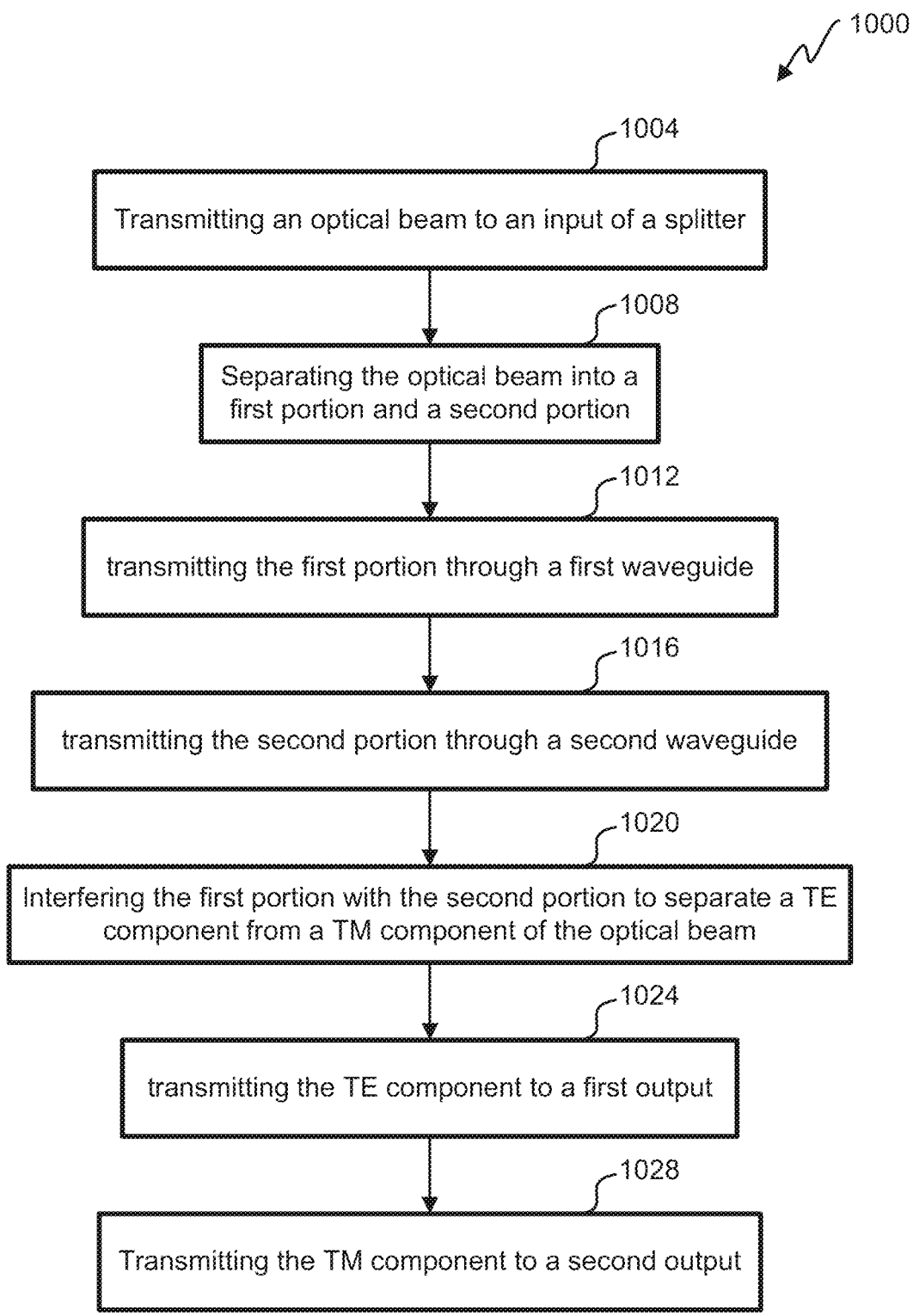
FIG. 10 is a flowchart of an embodiment of a process of using a device for an optical, polarization-independent isolator and/or circulator.

FIG. 10 is a flowchart of an embodiment of a process of using a device for an optical, polarization-independent isolator and/or circulator. Process 1000 begins in step 1004 with transmitting an optical beam to an input (e.g., input 504 or 604). In step 1008, the optical beam is separated at into a first portion and a second portion. The beam is separated in the first coupler 512-1 or 612-1. In step 1012, the first portion is transmitted through the first waveguide 516-1 or 616-1. The second portion is transmitted through the second waveguide 516-2 or 616-2, step 1016. In step 1020 the first portion is combined with the second portion to interfere (e.g., in the second coupler 512-2 or 612-2) to separate a TE component of the optical beam from the TM component of the optical beam. The TE component is transmitted to a first output (e.g., first output 508-1 or 608-1). The TM component is transmitted to a second output (e.g., second output 508-2 or 608-2).

The specific details of particular embodiments may be combined in any suitable manner without departing from the spirit and scope of embodiments. However, other embodiments may be directed to specific embodiments relating to each individual aspect, or specific combinations of these individual aspects.

The above description of exemplary embodiments has been presented for the purposes of illustration and description. It is not intended to be exhaustive or to limit the invention to the precise form described, and many modifications and variations are possible in light of the teaching above. For example terms such as "first," "second," and so on are used to differentiate similar components and/or features, not necessarily to enumerate how many components and/or features there are. The first coupler 612-1 of the second splitter 104-2 could be referred to as a third splitter and the second coupler 612-2 of the second splitter 104-2 could be referred to as a fourth splitter. In some embodiments, the input is directly coupled to the first coupler; the first waveguide is directly coupled to the first coupler and/or to the second coupler; the second waveguide is directly coupled to the first coupler and/or the second coupler; and/or the first output and/or the second output are directly coupled to the second coupler. The optical circulator 100, and/or portions of the optical circulator 100, can be integrated with components and/or features in the '914 Application. For example, the optical circulator 100 can be integrated on a substrate with a laser and/or an optical receiver. In some embodiments, the rotator material 212 can be processed similarly as a III-V chip in the '914 Application. For example, the rotator material 212 can be bonded to a floor of a recess, similarly as a III-V chip is bonded to a floor of a recess in the '914 Application. In some embodiments, rotator material 212 is bonded to a semiconductor platform concurrently with bonding III-V chips to the semiconductor platform; and/or etching the rotator material 212 is performed concurrently with etching a III-V chip after bonding. The embodiments were chosen and described in order to explain the principles of the invention and its practical applications to thereby enable others skilled in the art to utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A device comprising:
   a laser configured to emit light;
   a first splitter comprising:
      a first coupler configured to receive light from the laser at a first port and split light received at the first port into a first waveguide and a second waveguide;
      a second coupler configured to:
         receive light from the first waveguide and from the second waveguide; and
         transmit light received from the first coupler by the first waveguide and
      the second waveguide to propagate along a first path and along a second path;
      the first waveguide; and
      the second waveguide;
   a second splitter configured to:
      receive light from the first path and from the second path; and
      combine light received from the first path and from the second path to exit a second port;
   a first non-reciprocal polarization rotator in the first path between the first splitter and the second splitter;
   a first reciprocal polarization rotator in the first path between the first splitter and the second splitter;
   a second non-reciprocal polarization rotator in the second path between the first splitter and the second splitter;
   a second reciprocal polarization rotator in the second path between the first splitter and the second splitter; and
   a semiconductor substrate, wherein the laser, the first coupler, the second coupler, the first waveguide, the second waveguide, the second splitter, the first non-reciprocal polarization rotator, the first reciprocal polarization rotator, the second non-reciprocal polarization rotator, and the second reciprocal polarization rotator are integrated on the semiconductor substrate, wherein:

the first waveguide has a maximum cross-sectional width that is less than a maximum cross-sectional width of the second waveguide;
the maximum cross-sectional width of the first waveguide and the maximum cross-sectional width of the second waveguide are measured in a direction orthogonal to a direction of beam propagation and halfway between the first coupler and the second coupler; and
the maximum cross-sectional width of the first waveguide is less than a height of the first waveguide.

2. The device of claim 1, further comprising a third port, wherein:
the third port is part of the first coupler; and
light entering the second port, during operation, is transmitted to the third port.

3. The device of claim 1, wherein:
a height of the second waveguide and the height of the first waveguide are between 1.3 and 3 microns;
the device further comprises a third port, wherein the third port is part of the first coupler, and light entering the second port, during operation, is transmitted to the third port;
the first path comprises a crystalline semiconductor waveguide;
the first coupler and the second coupler are multi-mode interference couplers; and
the first non-reciprocal polarization rotator comprises garnet.

4. The device of claim 1, wherein the first path comprises a crystalline semiconductor waveguide.

5. The device of claim 1, wherein the first coupler and the second coupler are multi-mode interference couplers.

6. The device of claim 1, wherein the second splitter comprises two couplers and two waveguides optically connecting the two couplers.

7. The device of claim 1, wherein the first coupler is a 1×2 coupler.

8. The device of claim 1, wherein the first non-reciprocal polarization rotator comprises garnet.

9. The device of claim 8, wherein the garnet is integrated on the semiconductor substrate by being in a pit of a silicon-on-insulator (SOI) wafer.

10. The device of claim 1, wherein the semiconductor substrate is silicon.

11. A method for an optical isolator and/or circulator, the method comprising:
receiving light at a first port from a laser, wherein the first port is part of a first coupler, wherein:
the first coupler is part of a first splitter; and
the first splitter comprises the first coupler, a second coupler, a first waveguide between the first coupler and the second coupler, and a second waveguide between the first coupler and the second coupler, wherein:
the first waveguide has a maximum cross-sectional width that is less than a maximum cross-sectional width of the second waveguide;
the maximum cross-sectional width of the first waveguide and the maximum cross-sectional width of the second waveguide are measured in a direction orthogonal to a direction of beam propagation and halfway between the first coupler and the second coupler; and
the maximum cross-sectional width of the first waveguide is less than a height of the first waveguide;
splitting, using the first coupler, received light from the first port into the first waveguide and the second waveguide;
receiving, at the second coupler, light from the first waveguide and the second waveguide;
transmitting light, received by the second coupler, into a first path and a second path, wherein:
a first non-reciprocal polarization rotator is in the first path between the first splitter and a second splitter;
a first reciprocal polarization rotator is in the first path between the first splitter and the second splitter;
a second non-reciprocal polarization rotator is in the second path between the first splitter and the second splitter;
a second reciprocal polarization rotator is in the second path between the first splitter and the second splitter;
receiving light from the first path and the second path, at the second splitter, wherein the laser, the first coupler, the second coupler, the first waveguide, the second waveguide, the second splitter, the first non-reciprocal polarization rotator, the first reciprocal polarization rotator, the second non-reciprocal polarization rotator, and the second reciprocal polarization rotator are integrated on a semiconductor substrate; and
combining, at the second splitter, light received from the first path and from the second path to exit a second port.

12. The method of claim 11, wherein:
a height of the second waveguide and the height of the first waveguide are between 1.3 and 3 microns.

13. The method of claim 11, wherein:
the first non-reciprocal polarization rotator comprises garnet; and
the garnet is integrated on the semiconductor substrate in a pit of a silicon-on-insulator (SOI) wafer.

14. The method of claim 11, further comprising a third port, wherein:
the third port is part of the first coupler; and
the method further comprises transmitting light received at the second port to the third port.

15. A device for an optical isolator and/or circulator, the device comprising:
a laser;
a first splitter comprising:
a first coupler configured to receive light from the laser at a first port and split light received at the first port into a first waveguide and a second waveguide;
a second coupler configured to:
receive light from the first waveguide and from the second waveguide; and
transmit light received from the first coupler by the first waveguide and the second waveguide to propagate along a first path and along a second path;
the first waveguide; and
the second waveguide; and
a second splitter configured to:
receive light from the first path and from the second path; and
combine light received from the first path and from the second path to exit a second port, wherein:
the first waveguide has a maximum cross-sectional width that is less than a maximum cross-sectional width of the second waveguide;
the maximum cross-sectional width of the first waveguide and the maximum cross-sectional width of the second waveguide are measured in a direction orthogonal to a direction of beam propagation and halfway between the first coupler and the second coupler; and the maximum cross-sectional width of the first waveguide is less than a height of the first waveguide.

16. The device of claim 15, wherein the laser, the first coupler, the second coupler, the first waveguide, the second waveguide, and the second splitter are integrated on a semiconductor substrate.

17. The device of claim 15, wherein the first waveguide is crystalline silicon and the second waveguide is crystalline silicon.

* * * * *